United States Patent [19]

d'Iribarne et al.

[11] Patent Number: 5,069,703
[45] Date of Patent: Dec. 3, 1991

[54] COVERING FOR THE TEMPERING OF GLASS

[75] Inventors: Benoit d'Iribarne; Hans-Werner Kuster, both of Aachen, Fed. Rep. of Germany; Luc Vanaschen, Eupen, Belgium

[73] Assignee: Saint-Gobain Vitrage, Courbevoie, France

[21] Appl. No.: 415,774

[22] Filed: Oct. 2, 1989

Related U.S. Application Data

[63] Continuation of Ser. No. 257,875, Oct. 14, 1988, Pat. No. 4,906,271.

[30] Foreign Application Priority Data

Oct. 14, 1987 [FR] France ............... 87 14185

[51] Int. Cl.$^5$ .............................. C03B 21/00
[52] U.S. Cl. .................... 65/104; 428/256; 428/426; 428/432; 428/246
[58] Field of Search .......... 428/256, 426, 432, 246; 65/104

[56] References Cited

U.S. PATENT DOCUMENTS

| | | | |
|---|---|---|---|
| 1,955,163 | 4/1934 | Adams | 65/119 |
| 2,822,645 | 2/1958 | Weller et al. | 65/351 |
| 2,969,613 | 1/1961 | Lambert et al. | 65/273 |
| 3,265,488 | 8/1966 | Ross et al. | 65/288 |
| 3,307,930 | 3/1967 | Stevens et al. | 65/290 X |
| 3,311,463 | 3/1967 | Atkeson | 65/119 |
| 3,399,985 | 9/1968 | Greener et al. | 65/374.15 |
| 3,459,521 | 8/1969 | Nedelec | 65/356 X |
| 3,469,963 | 9/1969 | Beattie | 65/115 |
| 3,482,954 | 12/1969 | Yuen | 65/29 |
| 3,586,492 | 6/1971 | McMaster | 65/273 X |
| 3,634,057 | 1/1972 | Tate et al. | 65/163 |
| 3,634,059 | 1/1972 | Miller | 65/374.11 X |
| 3,694,182 | 9/1972 | Akfirat et al. | 65/288 |
| 3,741,743 | 6/1973 | Seymour | 65/374.12 X |
| 3,778,244 | 12/1973 | Nedelec et al. | 65/106 |
| 3,840,360 | 10/1974 | Wright et al. | 65/119 |
| 3,867,748 | 2/1975 | Miller | 29/115 |
| 3,973,943 | 8/1976 | Seymour | 65/348 |
| 3,992,182 | 11/1976 | Frank | 65/163 |
| 4,043,786 | 8/1977 | Myers | 65/114 |
| 4,058,200 | 11/1977 | Frank | 198/411 X |
| 4,226,608 | 10/1980 | McKelvey | 65/106 |
| 4,229,201 | 10/1980 | Comperatore et al. | 65/290 X |
| 4,230,475 | 10/1980 | Dunk | 29/115 X |
| 4,242,782 | 1/1981 | Hanneken et al. | 29/129 |
| 4,387,890 | 6/1983 | Lampe | 198/411 X |
| 4,399,598 | 8/1983 | Page et al. | 29/123 X |
| 4,404,011 | 9/1983 | McMaster | 29/123 X |
| 4,499,990 | 2/1985 | Fishback | 198/411 |
| 4,508,556 | 4/1985 | Bennett et al. | 65/106 X |
| 4,526,605 | 7/1985 | Frank | 65/104 X |
| 4,556,408 | 12/1985 | Fecik et al. | 65/289 |
| 4,557,745 | 12/1985 | Halberschmidt et al. | 65/106 X |
| 4,609,391 | 9/1986 | McMaster | 65/106 X |
| 4,661,141 | 4/1987 | Nitschke et al. | 65/273 |
| 4,678,495 | 7/1987 | Yoshizawa | 65/374.13 |
| 4,751,776 | 6/1988 | Reunamäki | 29/129 |
| 4,764,196 | 8/1988 | Boutier et al. | 65/106 |
| 4,773,925 | 9/1988 | Schultz | 65/106 |
| 4,775,402 | 10/1988 | Letemps et al. | 65/107 |
| 4,793,459 | 12/1988 | Forknall et al. | 29/123 X |
| 4,802,903 | 2/1989 | Kuster et al. | 65/106 |
| 4,802,904 | 2/1989 | Boutier et al. | 65/106 |
| 4,813,993 | 3/1989 | Letemps et al. | 65/273 |
| 4,820,327 | 4/1989 | Letemps et al. | 65/107 X |
| 4,826,522 | 5/1989 | d'Iribarne et al. | 65/351 X |
| 4,838,920 | 6/1989 | Gonzales et al. | 65/104 |
| 4,865,638 | 9/1989 | Kudo | 65/273 |
| 4,906,271 | 3/1990 | d'Iribarne et al. | 65/104 |
| 4,924,688 | 5/1990 | Cutmore | 29/130 X |
| 4,992,088 | 2/1991 | Sassanelli et al. | 65/289 X |

FOREIGN PATENT DOCUMENTS

| | | | |
|---|---|---|---|
| 1083638 | 4/1986 | Japan | 65/374.15 |
| 1158360 | 7/1969 | United Kingdom . | |
| 2188045 | 9/1987 | United Kingdom . | |

Primary Examiner—James J. Bell
Attorney, Agent, or Firm—Oblon, Spivak, McClelland, Maier & Neustadt

[57] ABSTRACT

A device for air-tempering, optionally associated with bending of glass plates includes a covering made of a metal fabric and exhibiting a thermal conductivity less than 3 and preferably less than 0.2 W.M$^{-1}$.K$^{-1}$. It has utility for coverings of frames intended to carry glass plates during their tempering and/or their bending and/or their transport.

11 Claims, 1 Drawing Sheet

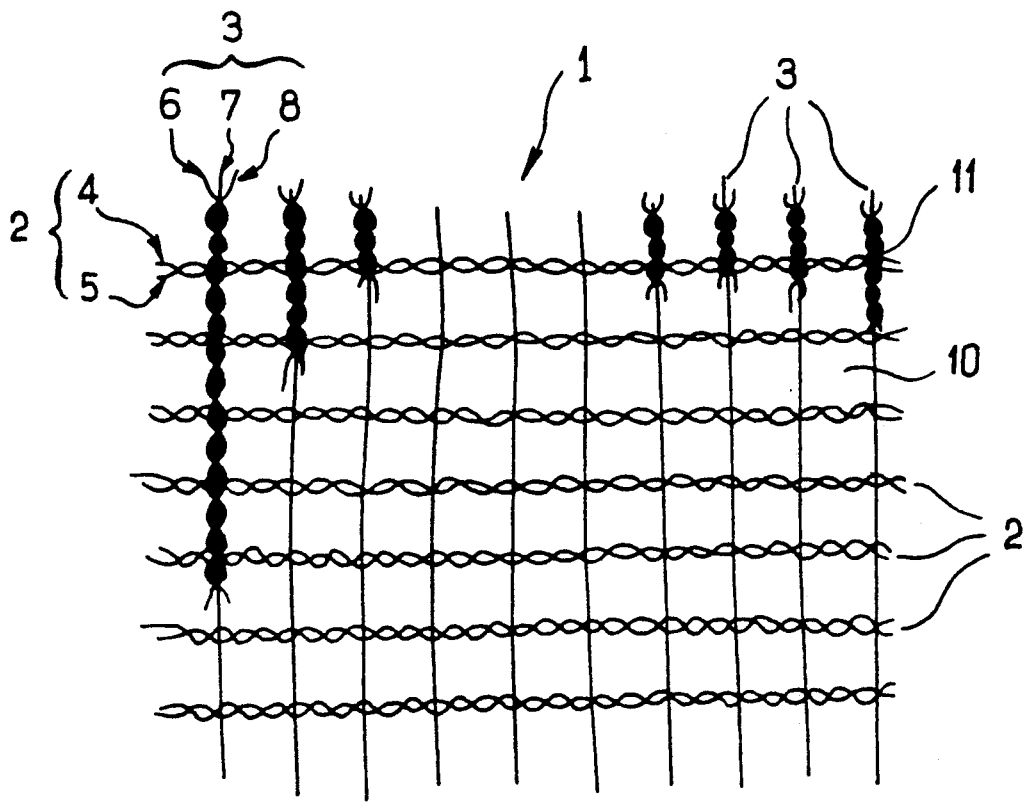
FIG._1
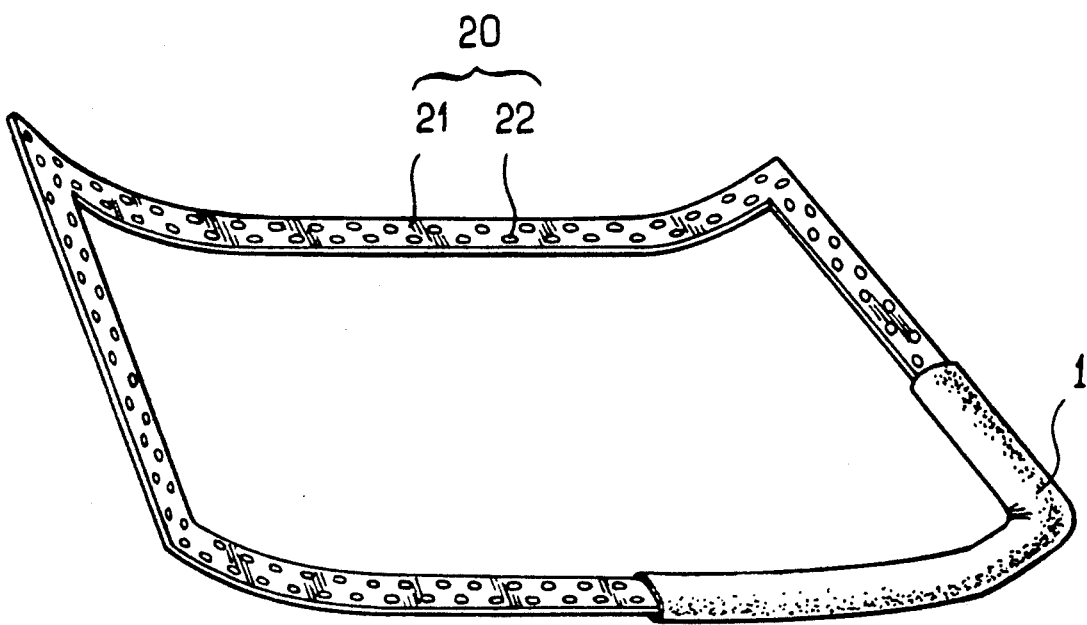
FIG._2

COVERING FOR THE TEMPERING OF GLASS

This is a continuation of application Ser. No. 07/257,875, filed on Oct. 14, 1988 now U.S. Pat. No. 4,906,271.

BACKGROUND OF THE INVENTION

1. Field of Invention

This invention relates essentially to air-tempering, optionally associated with bending of glass plates and more particularly to a covering for a frame intended to carry glass plates during their tempering, their bending and optionally their transport.

2. Background of the Related Art

One of the known techniques of bending and air-tempering of glass plates uses a frame, with a curved profile, open in its center, on which the glass plates rest so as to be bent, tempered, transported, etc. Such frames are described, for example, in French patent FR 2 572 388.

A glass plate heated to its bending and tempering temperature is placed on such a frame and there can undergo bending by the simple effect of gravity and/or pressing, it can then be transported while still resting on this frame, particularly to the tempering station where it is subjected to an intense blowing. It is possible to use a single frame when going from one work station to the next, but it is also possible to use a plurality of frames, each coming in at a well-defined station, the glass plates therefore changing support means when they go from one station to the next. This plurality of frames in certain cases can be required only by a particular organization of the tasks to be performed, but rather often it is also made necessary by the inability of a single frame to perform all the roles: of bending frame, tempering frame, transport frame, etc. Actually, to perform all these roles the frame should have multiple qualities that are not easily compatible: it should resist high temperatures, have a good mechanical strength to be able to withstand the bending operations; particularly by pressing; it should also have a poor thermal conductivity so as not to mark the glass thermally or even make it break when the glass and frame are at temperatures that are too different from one another. Further it should have a high porosity to air, so as not to constitute a screen, with regard to the glass, to the air which is blown during tempering.

Various types of frames have been tried to obtain this but none has been completely satisfactory or able to be used in a field slightly broader than that for which it was strictly designed (limited curvature forms, limited glass/frame contact times not allowing long bending times for deep or complex shapes to be given to the glass, or not allowing pressing, etc.).

Thus, it is standard practice to cover a frame with a metal netting with fine meshes, for example, of bronze; the desired porosity and mechanical strength are obtained but the deformability of the netting is not sufficient for a perfect fit of some complicated shapes of frames, and the thermal insulation that the netting provides is not sufficient to allow very long glass/frame contact times.

In an effort to improve heat insulation, the metal netting was replaced by glass or ceramic fabric, but a problem of durability, i.e., of crumbling, of the fabric then arises.

There were then proposed metal frames, perforated or equipped with small-sized projecting pins, on which the glass rests, or grooves made in the thickness of the metal of the frame, thus reserving passages under the glass for the tempering air. Generally, such frames with pins or grooves or perforations can function if the glass/frame contact time is short; but if the time is extended, in particular because of pressing or because the shapes it is desired to give the glass are complex and require a little longer shaping time, breaking of the glass is observed.

Along the same line, French patent FR 2 597 089 proposes, instead of metal nettings, a perforated metal strip having a porosity to air of at least about 40%. Such a perforated metal strip is difficult to put in place, difficult to fit perfectly on frames with a complex shape, its porosity is too slight if it is desired that it maintain a sufficient mechanical strength and the thermal insulation that it provides is not sufficient.

SUMMARY OF THE INVENTION

This invention has as an object the providing of a covering exhibiting qualities of mechanical strength, thermal insulation, porosity to air, resistance to high temperature and deformability that allow its use as covering and of means for support, contact, transport of glass and particularly during its bending and/or its air-tempering.

For this, it proposes a covering and support intended to be inserted between objects of hot glass, particularly glass plates brought to their bending and tempering temperature. The covering comprises an essentially metal fabric exhibiting a thermal conductivity less than 3 and preferably less than 0.2 $WM.^{-1}.K^{-1}$.

In a first embodiment, this covering is an essentially metal fabric formed by rovings of a plurality of elementary threads, the rovings placed in different directions together to form meshes and crisscrossing to form knots at the tops of the meshes, thanks to which said meshes are dimensionally stable.

In a second embodiment, this covering consists of the metal fabric itself and an intermediate ceramic layer of the zirconium oxide type deposited under the metal fabric.

BRIEF DESCRIPTION OF THE DRAWINGS

The invention will now be described more in detail with reference to the accompanying drawings in which:

FIG. 1 is a diagrammatic view of a fabric according to the invention and corresponding to the first embodiment, and FIG. 2 is a diagrammatic view of the fabric according to FIG. 1 covering a frame for bending, tempering and/or transport of the glass plates.

DETAILED DESCRIPTION OF THE PREFERRED EMBODIMENTS

FIG. 1 shows an example of a fabric 1 exhibiting the characteristics necessary for a frame or a covering of a glass support frame, entering into bending, air-tempering and/or transport, namely:
resistance to high temperatures,
mechanical strength,
insulation,
porosity to air,
deformability to fit all the profiles of the frames.

So far, the expression support frame or support means of the glass has been used, which implies that this frame or this support means is placed under the glass. Actually, the invention is applicable to any frame or means coming in contact with the glass, whether it is above or below, and the word support is to be taken in this more general sense.

This fabric 1 is made essentially of metal threads of the refractory stainless steel type to contribute, thanks to the metal, a mechanical strength and resistance to high temperatures.

In this first embodiment, the insulation and porosity to air are contributed by the fineness of the elementary threads of the fabric and their mode of assembly.

The elementary threads used are thin, of a diameter less than 50 microns, particularly less than 30 microns and preferably less than 15 microns, for example on the order of 10 microns. This thinness of the threads contributes to the capacity of the fabric to be deformed to fit the profile of the frames.

A plurality of these threads, at least about 90, is arranged in each of the rovings 2 and 3. By way of non-limiting example, rovings 2 shown horizontally in FIG. 1 consists of several strands, for example, two strands 4 and 5, each strand itself consisting of one or more groups of elementary threads, for example, three groups of 90 elementary threads each.

The other rovings 3, placed vertically in FIG. 1, as shown by way of example, are made up of several strands, for example, three strands 6, 7 and 8 themselves formed by several groups of elementary threads, for example, two groups of 90 elementary threads. Each roving 3 is knotted over its entire length and in particular crisscrosses rovings 2 arranged in another direction to constitute meshes 10 having, at their nodes, knots 11 for binding rovings 2 and rovings 3.

Thanks to these knots 11 at their nodes, meshes 10 are dimensionably stable.

The example of fabric shown in FIG. 1 exhibits approximately square meshes of about 5 mm on each side, and it has a thickness of about 0.5 to 2 mm.

Advantageously, to increase the mechanical strength of this fabric and in particular the dimensional stability of its meshes, additional strands 4, 5, 6, 7 and 8 do not belong solely to one roving 2 or 3, but over their length they successively belong to one roving, then to another. They form a series of adjacent loops, partially covering the loops of another series of adjacent loops placed opposite thereto and in the opposite direction, all these loops being knotted by fours as well as, for example, an additional, for example vertical, strand placed between the adjacent loops of each series, with a strand, for example, horizontal.

Thus, each loop participates over a part of its length in the formation of a roving, for example 3, then in the formation of another roving, for example 2, then in the formation of a roving of type 3 close to the preceding one.

Others modes of weaving are also possible.

The porosity to air of such a fabric is at least about 60% and preferably on the order of at least 80%. The meshes can be quadrilaterals, for example squares, with a side of from 2 to 10 mm.

Other forms are also possible, in particular when the a number of rovings is greater than 2; the surface area of the meshes, however, always remaining of the same order, i.e., between about 4 mm$^2$ and 1 cm$^2$.

Such a fabric has a thermal conductivity less than 3 and preferably less than 0.2 W.M$^{-1}$.K$^{-1}$, which corresponds to a thermal resistance between $10^{-3}$ and $50.10^{-3}$M$^2$.K.W$^{-1}$.

Such a fabric is used particularly to cover a tempering and/or bending and/or transport frame 20 as shown in FIG. 2, this frame being metal or essentially metal.

To allow the tempering air to pass through this fabric 1, it is important that the tempering air not be stopped by frame 20 itself. This frame 20 is then punched; for example the frame can consist of a flat iron 21 pierced with orifices such as 22 as shown in FIG. 2, or constituted in an equivalent manner, for example formed of a section on which are fastened spaced pins intended to carry the glass to form a gap in which the air can circulate, or a section in which striae or grooves are made to let the air pass, or a section with a notched edge, these different embodiments not being represented.

In another embodiment, the covering consists of an essentially standard metal lattice or a fabric identical with that described above and there is included an intermediate insulating layer, for example, with a ceramic base of the zirconium oxide type.

This zirconium oxide is deposited, for example, on the support intended to come in contact with the glass, by spraying of powder in a flame, plasma or equivalent.

This support covered by the insulating intermediate layer, is then covered by a lattice or a fabric that is essentially metal. Advantageously to promote anchoring of the intermediate layer to the frame and to improve its mechanical strength especially at high temperature, a sublayer with a coefficient of expansion between that of the frame and that of the zirconium oxide layer is provided, for example, a sublayer with a Ni and Cr base. Frames for tempering, bending, transport of glass plates can also be covered as described in this second embodiment. This unit of standard metal lattice and intermediate layer has the same characteristics of thermal conductivity or thermal resistance as the individual essentially metal fabric described above.

Thanks to such coverings, the frames can carry the glass through their various thermal treatments, if desired, without it being necessary to change the frame at each treatment.

Such coverings can also be used as electromagnetic shields, as contact materials between any hot body and a support, as a sheath of rollers intended to transport hot glass in plates, as a conveyor belt or as covering of a conveyor belt intended to carry hot glass objects.

We claim:

1. Covering to be inserted between glass plates at their bending and tempering temperature and supports therefor, comprising an essentially metal fabric having a thermal conductivity less than 3 W.M$^{-1}$.K$^{-1}$.

2. Covering according to claim 1, wherein the thermal conductivity of said fabric is less than 0.2 W.M$^{-1}$.K$^{-1}$.

3. Covering according to claim 2, wherein said covering exhibits a thermal resistance of between $10^{-3}$ and $50.10^{-3}$M$^2$.K.W$^{-1}$.

4. Covering according to one of claims 1, 3 or 2, wherein the fabric exhibits a thickness of about 0.5 to 2 mm.

5. Covering according to one of claims 1, 3 or 2, wherein the fabric has a porosity to air of at least about 60%.

6. Covering according to one of claims 1, 3 or 2, including an insulating intermediate layer.

7. Covering according to claim 6, wherein the intermediate layer is a ceramic layer of the zirconium oxide type.

8. Covering according to claim 7, wherein the covering is formed on a frame, the frame having a coefficient of expansion, including a sublayer with a coefficient of expansion between that of the frame and that of the intermediate layer.

9. Covering according to claim 8, wherein the sublayer has an Ni or Cr base.

10. Covering according to claim 8, wherein the frames are perforated.

11. Covering according to claim 5, wherein said porosity is at least 80%.

* * * * *